(12) United States Patent
Huggett (10) Patent No.: US 8,339,129 B2
(45) Date of Patent: Dec. 25, 2012

(54) VIBRATION AND CONDITION MONITORING SYSTEM AND THE PARTS THEREOF

(75) Inventor: Raymond Huggett, Oxfordshire (GB)

(73) Assignee: Aktiebolaget SKF, Göteborg (SE)

( * ) Notice: Subject to any disclaimer, the term of this patent is extended or adjusted under 35 U.S.C. 154(b) by 196 days.

(21) Appl. No.: 12/308,321

(22) PCT Filed: Jun. 22, 2007

(86) PCT No.: PCT/EP2007/005526
§ 371 (c)(1),
(2), (4) Date: Dec. 14, 2010

(87) PCT Pub. No.: WO2007/147619
PCT Pub. Date: Dec. 27, 2007

(65) Prior Publication Data
US 2011/0095753 A1    Apr. 28, 2011

(30) Foreign Application Priority Data
Jun. 23, 2006  (EP) ..................... 06012991

(51) Int. Cl.
*G01N 27/72* (2006.01)
(52) U.S. Cl. .......................................... 324/239; 702/38

(58) Field of Classification Search ............. 324/239; 702/38
See application file for complete search history.

(56) References Cited

U.S. PATENT DOCUMENTS

| | | | |
|---|---|---|---|
| 3,619,805 A | 11/1971 | Bean | |
| 3,688,186 A | 8/1972 | Judd | |
| 4,598,260 A * | 7/1986 | Carr | 331/135 |
| 5,198,764 A * | 3/1993 | Spencer | 324/207.26 |
| 5,854,553 A * | 12/1998 | Barclay et al. | 324/207.16 |
| 2005/0284226 A1 * | 12/2005 | Boda et al. | 73/660 |

* cited by examiner

Primary Examiner — Huy Q Phan
Assistant Examiner — Temilade S Rhodes-Vivour
(74) Attorney, Agent, or Firm — Mark A. Ussai; Bryan Peckjian (57) ABSTRACT

A vibration and condition monitoring system and the parts thereof with a true digital signal processing based design, with very limited analog based general signal conditioning. Specifically a method of driving and a driver of eddy current probes that have a simple highly accurate analog part and a unit and a method of enabling efficient vibration monitoring in hazardous areas. This is achieved by an eddy current probe oscillator unit having independent control of an amplitude gain and control of an impedance measurement sensitivity, i.e. amplitude gain linearity in relation to probe impedance.

7 Claims, 7 Drawing Sheets

VIBRATION AND CONDITION MONITORING SYSTEM AND THE PARTS THEREOF

TECHNICAL FIELD

The invention concerns eddy current probe driver systems and related digital linearization either as a part of a digital processing module or as a stand-alone eddy current probe driver module, especially in hazardous zones. The invention also concerns vibration and condition monitoring systems.

BACKGROUND

Eddy Current Probe (ECP) sensor systems have been used since the 1970's for non-contact displacement measurements, in the monitoring and protection of rotating machines mainly operating with journal (sleeve) bearings. ECP systems are also commonly known as "Proximity Probe Systems".

Eddy current probes are dependent on a driver comprising an oscillator. The oscillator is used to excite the attached eddy current probe so that it can generate a changing magnetic field. This first magnetic field, when in close range to a steel target material, will induce time changing eddy currents in the surface of the target material. These eddy currents, in turn, will generate a second magnetic field that will oppose the originating first magnetic field and therefore affecting the resulting impedance of the probe tip. The size of the induced eddy currents is dependent on the distance between the probe tip and the steel target material. The probe impedance change is therefore a direct measurement of the distance between the probe tip and the target material.

Oscillator circuits in eddy current driver systems are commonly based upon a Collpits type oscillator using discrete matched transistor stages as active elements. The oscillator stage is current driven and basically operated in fully saturated mode, acting as a switch and thus providing the required energy to sustain an oscillation. The resulting amplitude is defined by the non-linearity of the drive currents and is temperature and device dependent as a result of parasitic influences. In order to attain a similar output response from multiple modules, this very low cost method requires amplitude calibration and also temperature and frequency compensation due to the used PN junctions of the driving transistors. In addition, amplitude stability is dependent on the stability of the load of the oscillator circuit due to output impedance and parasitic capacitors. Besides variations in parasitic influences between components, these capacitive load influences will also be frequency dependent and therefore affect the overall probe/cable tank impedance value. It is desirable that the oscillation frequency remains as constant as possible over the full operation range of a probe system even with various cable lengths. Furthermore, in order to tune the tank circuit for optimum impedance response for longer cable lengths, a parallel, commonly ferrite-based, load inductance is usually used in current systems. This ferrite-based inductor, however, will experience long-term change/drift over time and thus also have an effect on the tank circuit output impedance.

By using a constant drive current, the output voltage is a function of tank impedance and fundamental harmonic response of the excitation current. Due to these characteristics, for equal probe/cable systems, the resulting tank voltage is subject to level changes, and therefore cannot be assumed to be constant between different driver modules. This therefore requires undesirable manual calibration, and calls for better means of amplitude accuracy and stability. There thus seems to be room for improvement.

SUMMARY

An object of the invention is to define a method of driving and a driver of eddy current probes that have a simple, highly accurate analog part.

A further object of the invention is to define a unit and a method of enabling efficient vibration monitoring in hazardous areas.

The aforementioned objects are achieved according to the invention by an eddy current probe oscillator unit having independent control of an amplitude gain and control of a probe impedance measurement sensitivity, i.e. amplitude gain linearity in relation to probe impedance. According to the invention the eddy current probe oscillator unit comprises a dual feedback loop comprising a first leg and a second leg, i.e. a first feedback loop and a second feedback loop.

The aforementioned objects are also achieved by an eddy current probe oscillator unit arranged to be coupled to an eddy current probe. According to the invention the eddy current probe oscillator unit comprises a dual feedback loop comprising a first leg and a second leg. Suitably the second leg of the dual feedback loop is arranged as a voltage limiter to thereby create a defined voltage limited input which remains in phase with the output signal. Preferably an attached eddy current probe and a cable attaching the eddy current probe to the eddy current probe oscillator unit form a parallel LC tank of the eddy current oscillator unit. In some embodiments a gain of the first leg of the dual feedback loop at least in part defines the amplitude gain of the oscillator unit. Further a gain of the second leg of the dual feedback loop at least in part preferably defines a linearity of probe impedance detection sensitivity. In a preferred embodiment a gain of the first leg and a gain of the second leg of the dual feedback loop define a linearity of probe impedance detection sensitivity.

The aforementioned objects are further achieved according to the invention by a vibration monitoring system arranged to monitor at least one rotating part by means of measurements from at least one eddy current probe. According to the invention the system comprises a distributed unit locally to the at least one rotating part, the distributed unit comprising an eddy current driver according to any above described embodiment. Preferably the distributed unit is arranged to be located in a Zone 1 environment, or according to equivalent classification such as class 1 div 1, and the at least one rotating part is located in a Zone 1 environment.

With other system it could be argued that the fact that tank impedance changes become small when approaching infinity gap (far gap) as part of the non-linear probe response is a disadvantage. The ability to measure these small impedance changes will increase the measurement range of the applicable eddy current probe system. Therefore, the oscillator circuit should be optimized for being sensitive to small impedance changes (high $dV_{out}/dZ_{probe}$) towards the maximum probe impedance. Depending upon the intended monitoring application, the ECP system design needs to adapt to numerous parameter changes. These variables include, but are not limited to, displacement probe size, cable length, target material, and required output sensitivity.

Another principal limitation in the operational concept of other eddy current probe measurement systems is that it is not feasible to use long distances with coaxial cable between probe and the final signal conditioning—i.e. a direct connection from the probe mounted in the machine to a centrally located monitoring system, perhaps several hundred meters away. The present operational principles limit this distance to around 15 meters. Hence it is common practice to utilize a 'stand-alone' driver to perform the required conditioning within the acceptable distance.

Other systems could be said to have some disadvantages. Analog design eddy current probe systems use an analog "driver" to perform the necessary steps in-between the probe and the monitor. The variations in parameters such as probe size, cable length, cable parameters, etc. are accommodated by 'specially tuned' derivatives of a standard analog component range. This leads to many different components, which cannot be easily interchanged, between different eddy current drive systems. A commercial impact of such 'tuning' is that, in general, the probe, cable and driver must be all from the same manufacturer. For digital drivers there are known techniques that improve flexibility of a single eddy current probe system design (as opposed to the component variety of the fixed parameter based analog design). Once a linearization curve has been established for an eddy current probe system, the system in general remains static. Subsequently, the available signal processing power, used to establish the curve, remains unused but the component cost remains. Also the cost of analog to digital conversion, digital signal processing and then digital to analog conversion (to allow interfacing with standard, analog input based, monitoring and protection systems) would result in a commercially non-competitive product compared to proven analog designs. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its functioning and use will now be described in connection with FIGS. 1 to 15.

Instrumentation systems for the monitoring of vibration on critical machinery for the purposes of automatic shut-down and long-term equipment health, condition monitoring, requires vibration sensors mounted on the machinery. Most common are radial displacement probes such as eddy current probes, which need an analog oscillator/demodulator unit, often known as a "driver" or "proximitor". Other types of probes are "Seismic" sensors that measure surface vibration in either acceleration or displacement, and often do not require a driver. A driver will comprise an oscillator used to excite the attached eddy current probe so that it can generate a changing magnetic field. This magnetic field, when in close range to a steel target material, will induce time changing eddy currents in the surface of the target material in relation to the close range. These eddy currents, in turn, will generate a magnetic field that will oppose the originating field and therefore affecting the resulting impedance of the probe tip. The size of the induced eddy currents is dependent on the distance between the probe tip and the steel target material. The probe impedance change is therefore a direct measurement of the distance between the probe tip and the target material. This non-contact method can therefore be utilized for measurement of distance/gap (average DC component) and vibration of target machine axis (AC component).

The complex probe impedance is defined as:

$$Z_P = R + j\omega L$$

Where the resistance R represents the wire resistance of the coil of the probe and covers most of the probe losses as a result of magnetic field energy absorption by the target material. The inductance L represents the self-inductance of the coil and also has a relatively small contribution to the probe losses as a result of the magnetic field coupling to the target material. The latter implies small oscillation frequencies over the working gap range of the probe.

A special case is identified as the infinite gap or far gap condition. This represents the probe impedance NOT affected by magnetic field coupling losses. This therefore represents the pure probe coil properties consisting of coil wire resistance and self-inductance and this is identified as $Z_0$.

The probe and the coaxial interface cable together form a parallel LC tank circuit, as the coaxial cable can be identified as a 'distributed' capacitor. The probe/cable combination is usually described by a lossy transmission line (cable) loaded with the probe impedance (coil).

The output tank impedance (probe and cable) is an integral part of the oscillator circuit. The used oscillator type is a self-generating oscillator. At startup of the system, a charge will be applied to the capacitor of the tank circuit. The capacitor will discharge its energy to the inductor (coil). Due to the losses introduced by the voltage drop of the coil wire resistance the oscillation would dampen out. However the oscillator circuit will ensure that energy losses are compensated for and in addition ensure that oscillation amplitude will be kept constant at a defined amplitude.

A very important concept is the fact that oscillation only occurs when the tank impedance is purely resistive. In this so-called resonance mode the tank output impedance is purely resistive and therefore the resulting voltage response is a direct measure of the probe position relative to the target. The resonance (oscillation) frequency is predominantly defined by the probe inductance and cable capacitance. Consequently, when different probe types (inductances) or variations in cable lengths are used this will affect the oscillation frequency. It can be noted, that the influence of the probe to target position will also slightly affect the resulting oscillation frequency.

The oscillator output peak to peak voltage level will be a measure of the distance between probe and target, and the low frequency amplitude changes (envelope) will be a measure of the distance changes over time and thus represent target vibrations. The demodulator output will eliminate high frequency components and establish a high precision peak to peak detector that will be used as basic input for further digital processing according to the invention.

The relationship between the impedance voltage response and the probe-target distance is not linear, and therefore calls for further processing to obtain a linear relationship for distance measurements (generally described using an output sensitivity of 200 mV/mil for current analog systems). Furthermore, as can be derived from the above, variations in probe (R, L) and cable (R, C) can affect the resulting tank output impedance and therefore introduce errors, especially across various products, and thus require manual calibration to ensure a fixed linear output result.

The present invention also includes a shift into the digital domain, which offers the required flexibility to allow for automatic compensation and linearization options according to the invention with the objective to eliminate any need for manual calibration and restrictions within fixed hardware solutions for compensation and linearization (as used in current full analog designs). This is discussed further below. Taking into account a digital design core for hardware control and signal post-processing (linearization of the non-linear probe impedance response), the following system concept is used for the driver system according to the invention.

To accommodate for various cable lengths per probe type, resulting in different maximum impedance responses of the probe/cable assembly, driver oscillator operation is based upon using the longest cable length as a reference for a linearization process and use of external compensation capacitors and/or impedance matching networks to allow the use of shorter cable lengths. The main purpose for compensation is to obtain equal impedance response of actual cable length opposed to the reference cable length for the infinite gap measurement response. With this in mind the driver oscillator can be optimized for a single impedance range that will suit multiple probe types and cable lengths, and thus take advantage of optimum dynamic input range. Furthermore, the oscillator design is optimized to allow for independent control for both amplitude level and impedance measurement sensitivity. These parameters can then be digitally controlled and used for optimizing design for different probe types. The most important parameter of the oscillator according to the invention is its non-linear gain behavior. The functionality allows for more gain at higher probe system impedances. When the probe impedance changes per distance unit is getting smaller as the probe moves further away from the target, this feature according to the invention will provide more output gain. The oscillator according to the invention will thus to some degree provide a linearization, thus extending the usable measurement distance range of the probe system.

Naturally, the oscillator circuit is restricted by the boundary conditions for oscillation of feedback loop unity gain (1) and feedback loop 0° phase shift opposed to output signal. These boundary conditions need to apply for the fully anticipated impedance range of probe/cable to maintain required excitation oscillation.

Figure 1:
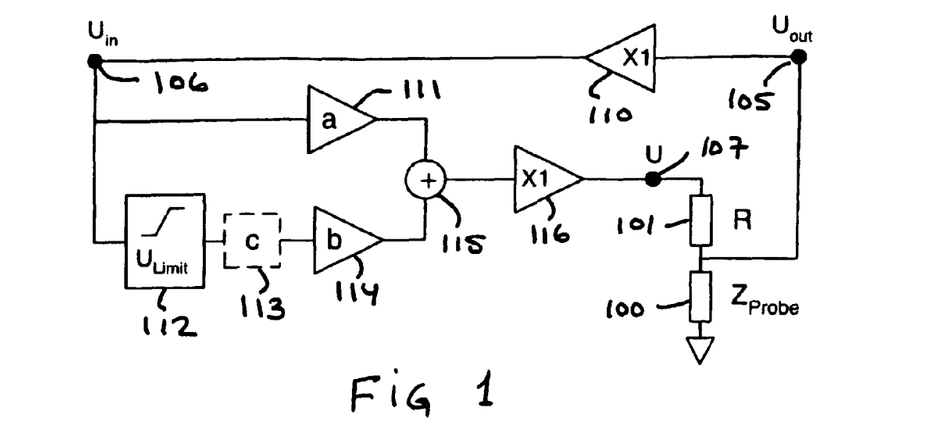
FIG. 1 illustrates an oscillator according to the invention.

The block diagram according to FIG. 1 illustrates the optimized oscillator design based upon using operational amplifiers 110, 116 or equivalents as basic building blocks. The oscillator design uses a dual feedback loop, of which a first leg is designated as a voltage limiter 112 to create a defined voltage limited input 106 which remains in phase with the output signal 105. Included in the voltage limiter 112 is a high gain stage to ensure voltage limiting during early stages of oscillation startup. Gain stages a 111 and b 114 will, in combination with output voltage divider R 101 and $Z_{probe}$ 100, ensure that overall feedback gain is unity and in-phase with the output signal 105 to meet oscillation boundary condition. In some implementations the gain stages a 111, b 115, and c 113 may be implemented with resistors and the adder 115 just being a common point for the resistors implementing gain stages a 111, b 114 around the buffer op-amp 116.

Due to the non-linearity of the voltage limiter 112, output voltage U 107 will also contain higher harmonics of the oscillation frequency. When oscillating, the probe/cable circuit will be in resonance and therefore acting as a band filter for the fundamental oscillation frequency. Therefore, only the fundamental harmonic signal will be coupled back to the input 106. A gain factor c 113 is optionally introduced to account for this fixed non-linearity effect. The following equations can be derived for this oscillator circuit:

$$U = a \cdot U_{in} + b \cdot c \cdot U_{Limit} \quad [1]$$

$$U_{out} = \frac{Z_{Probe}}{R + Z_{Probe}} \cdot U \quad [2]$$

$$U_{out} = U_{in} \quad [3]$$

From equations [1], [2], and [3] a relationship can be defined for the output voltage:

$$U_{out} = \frac{b \cdot c}{\frac{R}{Z_{Probe}} + (1 - a)} \cdot U_{Limit} \quad [4]$$

$$U_{out} = \frac{b \cdot c \cdot Z_{Probe}}{R + (1 - a) \cdot Z_{Probe}} \cdot U_{Limit} \quad [4'']$$

From [4''] it can be identified that $U_{out}$ 105 is a second order function of $Z_{probe}$ 100 and therefore has a non-linear character. As the probe/cable impedance will have a maximum value (infinite gap), the maximum oscillation amplitude $U_{Max}$ is defined as:

$$U_{Max} = \frac{b \cdot c}{\frac{R}{Z_{Max}} + (1 - a)} \cdot U_{Limit} \quad [5]$$

$U_{Limit}$ is defined in such a way that for a small output voltage U the limit voltage level remains constant for the full output voltage response as result of probe/cable impedance changes. From equation [5] one can derive a relationship for $U_{Limit}$ and substitute this into equation [4] to obtain a relationship of $U_{out}$ relative to $U_{max}$.

$$U_{out} = \frac{\frac{R}{Z_{Max}} + (1 - a)}{\frac{R}{Z_{Probe}} + (1 - a)} \cdot U_{max} \quad [6]$$

Using equation [6] and differentiating the output voltage function to the probe impedance, a relationship can be determined that will result in the highest output voltage change relative to impedance change:

$$\frac{dU_{out}}{dZ_{Probe}} = \frac{\frac{R}{Z_{Max}} + (1-a)}{\left[\frac{R}{Z_{Probe}} + (1-a)\right]^2} \cdot U_{max} \cdot \frac{R}{Z_{Probe}^2} \quad [7]$$

Using the result of equation [7] the maximum voltage change is defined as follows using the fact that the changes close to the maximum probe impedance ($Z_{Max}$) are mostly relevant in order to extend probe range:

$$\frac{R}{Z_{Max}} + (1-a) = 0 \quad [8]$$

From the result of equation [8] it can be concluded, that for a certain probe type and probe cable length a certain $Z_{Max}$ is known, thus leaving variables R and gain factor a to optimize the response.

Based upon maximum probe system impedance, output voltage and limit voltage a fixed relationship will exist between parameters a, b and R. By means of selecting two parameters, the remaining parameter, based upon pre-defined maximum settings, can be determined using equation [5], rewritten as equations [9], [10], and [11]:

$$a(b, R) := \frac{R}{Z_{Max}} + 1 - b \cdot c \cdot \frac{U_{Limit}}{U_{Max}} \quad [9]$$

$$b(a, R) := \frac{U_{Max}}{c \cdot U_{Limit}} \cdot \left(\frac{R}{Z_{Max}} + 1 - a\right) \quad [10]$$

$$R(a, b) := Z_{Max} \cdot \left(\frac{b \cdot c \cdot U_{Limit}}{U_{Max}} - 1 + a\right) \quad [11]$$

The behavior of the U(z) relationship, as defined in [1], depends on the parameter settings a, b and R. Within this respect it has to be noted that for a defined maximum output voltage at maximum expected probe system impedance a variety of options are possible to meet these requirements. However, as can be derived from equation [1] the function U(z) heavily depends on parameters a, b and R.

Parameters a and b also determines the non-linear behavior of the oscillator transfer function. If a<1 and b>1 then the transfer function will be a non-linear behavior where low impedance values are amplified more than higher impedance values. If a=1 then the transfer function will be a linear behavior between output voltage and impedance. Finally if a>1 and b<1 then the transfer function will be a non-linear behavior where high impedance values are amplified more than lower impedance values.

Figure 2:
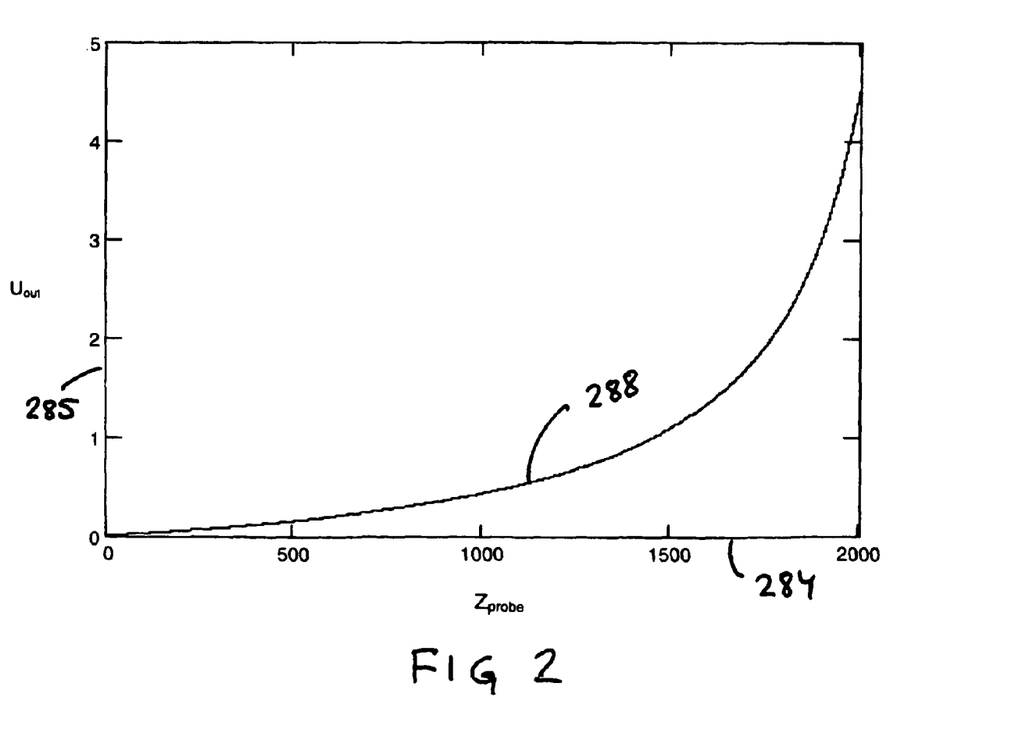
FIG. 2 illustrates the oscillator non-linear transfer function.

FIG. 2 illustrates a situation where the oscillator shows a non-linear output response 288 with a=1.272, b=0.153, and R=604. Thus when the probe impedance $Z_{probe}$ 284 increases the output $U_{out}$ 285 is amplified more. We can in this manner stretch small impedance changes per distance movement already by means of the oscillator.

With a fixed relationship of parameters a and b to optimize oscillator response as a first step in linearizing the non-linear probe impedance response, and with the fixed parameters $U_{Limit}$ and calculation conversion factor c, this leaves only parameter R (combined with a known $Z_{Max}$ of the ECP system) to determine the maximum output voltage.

From equation [6] it can be concluded that the output voltage change, relative to defined maximum voltage, is purely dependent on the probe/cable impedance change given the defined relationship of R and a (and b) of equation [8].

Based upon the above design the objective to have independent control of output signal amplitude and optimization of impedance change response, the following control parameters apply:
1. Non-Linearity: combination of parameters a and b.
2. Amplitude gain: resistor value R (in combination with a fixed gain factor a)

With reference to the above and equation [5] it can be concluded that some level of hardware optimization, for different conditions, can be obtained when R is matched with the actual impedance of the probe (Zp) that may be different from target due to changes in probe and cable characteristics. In general these changes will have a much higher effect when the cable length becomes longer and therefore will not be able to be compensated in combination with the linearization function.

The driver according to the invention is thus a probe excitation based upon using a 'self-generating' oscillator and not a design of having a probe/cable system being tuned into resonance using a variable frequency signal generator. The design advantages of the present invention are many, such as a defined, mainly resistive probe/cable tank impedance load. By using conventional op-amps, or equivalents, the tank impedance load will not consist of active parasitic capacitive impedances. The circuit according to the invention is a voltage controlled loop. By using a highly accurate voltage limiter, using the output signal as an input, and using highly accurate gain defining resistors, the amplitude variations as a result of component issues, equal tank impedance gain, will have a high accuracy between different products. This will either partially or completely eliminate the need for manual hardware calibration. The circuit is frequency independent. This will eliminate the need for parallel compensation inductors, which may change response over time. The circuit design according to the invention is a low current design to meet Intrinsic Safety approval for zone 1. Any mention to a specific hazardous zone classification such as zone 1 is according to zone 1 or according to an equivalent classification such as class 1 division 1. There is no manual range calibration requirement, and there is a high level of module interchangeability—'one module supports all probes' concept. However, the resistor value R can be tuned to compensate for resistive loading of probe/cable tank impedance circuit by the oscillator circuit.

Figure 3:
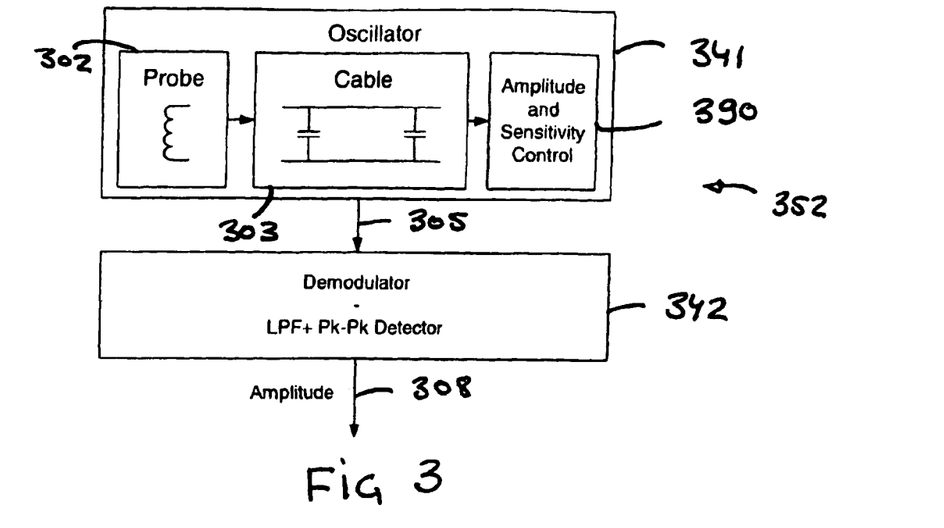
FIG. 3 illustrates a block diagram of a driver according to the invention.

FIG. 3 illustrates a driver 352 comprising an oscillator circuit 390 according to the invention. The circuit 390 according to the invention forms one part of the complete oscillator circuit 341 which also comprises a probe 302 and a cable 303. Following the output of the oscillator 305 is a high-speed peak-peak detector 342 to convert the dynamic high frequency output signal into a DC voltage output signal 308 representing the gap between probe and target and superimposed the shaft vibration signal (low frequency up to 10 kHz). A driver 352 commonly comprises the demodulator, low pass filter and peak to peak detector 342 functions and the oscillator 341. This driver 352 comprising the oscillator circuit and demodulator and peak to peak detector 342 can be used in a stand alone configuration where the output signal 308 is transferred to a central processing place, or it can be integrated with distributed digital processing means according to the invention as described later.

A driver according to the invention as described above can be implemented in an instrumentation room based system. There is a need to monitor vibration on critical machinery in high ignition risk environments, such as they exist in the energy sector, for example the oil & gas business, for the purposes of automatic shut-down and long-term equipment health, condition, monitoring. In high ignition risk industries such as the oil & gas business the control room is designated a safe area with respect to flammable gases.

A driver according to the invention as described above can also be implemented in a machine based system. In many businesses/industries, such as the oil & gas business, a machine is designated a 'hazardous area' with respect to flammable gases—and divided into 'zones' of ignition. Any electrical device located in a hazardous area must be designed such that—in the event of a component failure—an ignition source (e.g. spark) is either impossible or contained, and cannot reach the flammable gas. The concept of an intrinsically safe monitoring and protection system with a distributed nature according to the invention resolves many disadvantages. To enable the invention, the eddy current driver according to the invention described above, is integrated with digital signal processing to thereby form a complete unit integrating vibration monitoring and part of the condition monitoring, that communicates over digital signal lines according to the invention to the distributed control system and a central condition monitoring part. This unit can comprise a plurality of drivers and inputs for sensors not requiring drivers.

Analog systems, as described above, mainly comprise three separate components to form an eddy current system—a displacement probe, a cable and an oscillator/demodulator, usually known as a driver or proximitor. The probe driver performs probe activation/excitation and in many cases also analog signal linearization and some signal conditioning, to be ready for input to an external monitoring and protection system device. If the driver comprises analog circuitry for linearization and signal condition for a variety of eddy current displacement probe types, the driver becomes very complex.

Depending upon the intended monitoring application, the eddy current probe system design systems needs to adapt to numerous parameter changes. These variables include, but are not limited to, displacement probe size, cable length, target material, and required output sensitivity. Another principal limitation in the operational concept of the eddy current probe measurement is that it is not feasible to use long distances with coaxial cable between probe and the final signal conditioning—i.e. a direct connection from the probe mounted in the machine to a centrally located monitoring system, perhaps several hundred meters away. The present operational principles limit this distance to around 15 meters. Hence the use of a stand-alone driver to perform the required conditioning within an acceptable distance from the probe.

A digital driver will improve the flexibility of a single eddy current probe system design, as opposed to the component variety of the fixed parameter based analog design. However, a digital driver—as a stand-alone product—will in general remain static once a linearization curve has been established for an eddy current probe system. Subsequently, the available signal processing power, used to establish the curve, remains unused but the component cost remains. The cost of analog to digital conversion, digital signal processing and then digital to analog conversion to allow interfacing with standard, analog input based, monitoring and protection systems, would result in a commercially non-competitive product compared to proven analog designs.

With the introduction of distributed condition and protection monitors local to the machine according to the invention, the final signal conditioning can be performed within the distance limitation of the eddy current probe (ECP) system, and the need for individual sensor wiring to remote monitoring and protection systems is eliminated. This invention, based upon the predominantly digital signal processing character of a distributed monitoring and protection module, therefore includes the driver signal conditioning hardware into the product, and utilizes the digital signal processing power for the required linearization in a more cost effective manner, as the main function of digital signal processing is continuous monitoring and protection function of connected sensors. An additional effect of the inclusion of the driver hardware into that part of the invention is the full elimination of any required digital to analog conversion and copper wire interface between driver and monitor, thus optimizing cost, effectiveness and overall system quality and reliability. Adding further to reliability, this system also monitors the presence of the RF probe excitation signal in addition to the common DC output level probe OK monitoring of the driver output. Therefore, the invention provides a higher diagnostic coverage, in addition to regular DC based OK monitoring, for probe system failures. Configuration software will allow for in-situ calibration and linearization of directly attached displacement probe types and various cable lengths (tailored to the needs of different applications).

The system according to the invention allows an overall system cost reduction by excluding the need for separate analog driver system. The certification that permits location and operation of the invention—including integrated eddy current probe driver signal conditioning—in a Zone 1 hazardous area on the machine base itself is optimized by hardware integration for distributed use. Increase the reliability and reduce maintenance issues by support for flexible, but restricted, displacement probe cable lengths using a single driver device. Increase reliability and reduce maintenance issues by support for different make and type of displacement probes using a single driver device. There is also according to the invention a software-driven in-situ calibration and linearization option.

Figure 4:
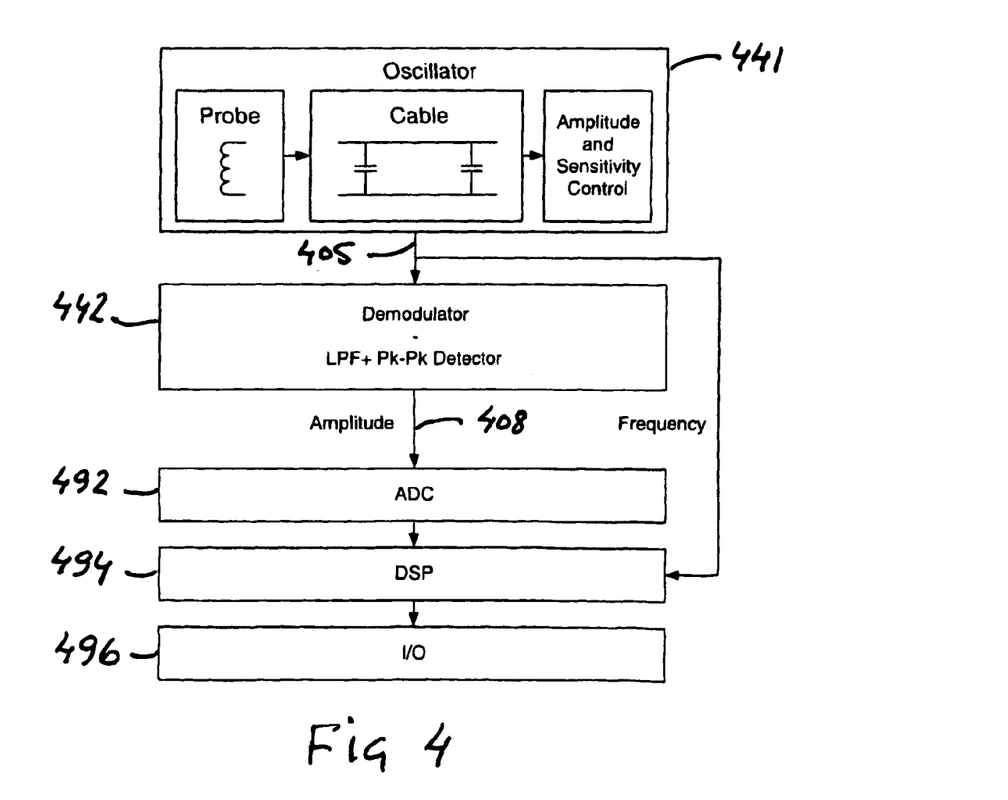
FIG. 4 illustrates a block diagram of a digital driver according to the invention.

FIG. 4 illustrates the major parts of the distributed part of a distributed vibration and condition monitoring system according to the invention. The distributed part comprises one or more eddy current probe interfaces to thereby make up the oscillator 441 part which in turn delivers a high frequency output 405. Following the output 405 of the oscillator 441 is a high-speed peak-peak detector 442 to convert the dynamic high frequency output signal into an output signal 408 comprising a DC voltage representing the gap between probe and target and a superimposed low frequency signal up to about 10 kHz representing the shaft vibration signal. This demodulated and peak to peak detected output signal 408 is thereafter analog to digital converted in an AD converter 492 before the then digital signal is brought into the digital signal processing part 494. After processing and data reduction according to the invention, explained in detail below, data is transmitted via an I/O interface 496 to a distributed control system for shutdown control.

One approach to perform probe function monitoring for eddy current probe systems is to monitor the DC gap voltage. However this method of detection depends not only on the probe/cable but also upon proper operation of a substantial amount of electronic circuitry such as the oscillator, peak to peak detector. This method cannot therefore be 100% conclusive in identifying actual malfunction of the probe and/or cable interface. In addition this approach is particularly ineffective in thrust monitoring applications where the DC gap measurement is both the measurement parameter and the probe control measure. Hence the system is unable to distinguish between a simple out of range and actual component failure. Correct function detection according to the invention based on oscillation frequency provides such a distinction and if employed together with DC voltage monitoring allows for the detection and identification of both out of range and failure. In this situation the oscillation frequency can be monitored and in the event this is outside an expected range a probe or (oscillator) circuit failure can be determined at an earlier stage. The high frequency signal 405 is therefore connected to the digital signal processing part 494 for frequency measurement and thereafter range checking. This method will therefore positively contribute to a more reliable and redundant method for probe function monitoring.

Furthermore, when monitoring the actual oscillation frequency, one can compare the response with predefined specific probe system data. Different probe types may operate at various oscillation frequencies. When a frequency deviates from a predefined range according to a configuration, this will indicate a mismatch between the configuration and the connected probe type and can be used to prevent possible shutdown as result of human error, i.e. use of a wrong probe type or a wrong configuration. Similar, for a correct configuration, a warning can be issued when the frequency and/or the amplitude response moves away from a nominal operating value, indicating that the impedance is changing as a result of physical changes to the system, i.e. change of probe coil characteristics as a result of environmental conditions. In addition to the frequency monitoring—during system setup—the infinitive gap response can be compared against expected values. In case the oscillation frequency is as expected but a significant change is identified in amplitude response this will identify a cable with different cable characteristics and will therefore require new calibration information, i.e. a replacement of an extension cable with a different characteristics than the previous version.

Based upon the ability of frequency and amplitude monitoring advanced impedance correction techniques, in principle similar to the next described linearization techniques according to the invention, can be used to compensate for non probe-target distance related system characteristic changes, such as resistive probe cable losses.

Due to non-linear behavior of the probe position response, output signal processing is required to obtain a linear response. The probe/cable impedance is directly related to the probe type, probe coil parameters, the probe position, the cable parameters, the cable length, oscillation frequency and the target material. Based upon experience there is no need for accommodating automatic methods to respond to different target materials etc. Linearization is based upon known target materials, probe types and cable characteristics and will accommodate for a practical range of cable lengths.

The used linearization method is predominantly based upon compensating for capacitance influences as introduced by probe cable, input capacitance differences between modules and input channels. Main input for this linearization process is the difference in infinite gap value response. This method allows for elimination of the need for individual component trimming (probe cable, extension cable and driver) and therefore reduces field calibration and maintains a high level of inter-product replacement ability, besides manufacturing cost savings.

However, besides capacitance changes, there will also be probe differences that will manifest themselves in changes in coil tip inductance values. These variances can be caused by deviations in the winding process (wire diameter, tension, uniformity, number of turns, etc.). The inductor variances will manifest themselves predominantly in a change of oscillation frequency, but of course also have influence on the infinite gap response in similar way as change of capacitance in the probe oscillation tank circuit. When probe systems are linearized based upon the capacitance change based linearization concept, this is based upon equal non-linear behavior of the probe tip.

In principle we have two methods for compensating for probe tip variations. The first method is called Pre-Linearization Compensation, this method, basically similar to the actual linearization method, will update each measurement sample to the probe tip coil characteristics as used for linearization library generation. An advantage of this method is that the compensation is applied on the full measurement range and provides best results. A disadvantage is that this involves processing time on a per sample basis using a polynomial high order algorithm. The second method is called Post-Linearization Compensation, this method is based upon the behavior that the linearization process results in relatively small changes of output sensitivity that will show larger deviations at higher gaps. This option therefore allows for optimizing the internal system offset and gain factors during calibration process and therefore have the major advantage that it will involve no further processing time (and power).

These methods allow for elimination of the need for individual component trimming, probe cable, extension cable and driver, and therefore reduce field calibration and maintain a high level of inter-product replacement ability. In the event that system characteristics have changed significantly, the system allows for system recalibration based upon factory originated linearization calibration data. There is no need for in-field system calibration. The main field requirement is to obtain the infinite gap response of a probe in question prior to installation. The unit stores probe identification information in case these tasks are executed prior to final system installation. Measured infinite gap response is used as a basis to determine the actual sets of coefficients required for executing the compensation of the impedance measurement voltage and linearization of the result thereof. However, there are no given restrictions to execute a specific field calibration to obtain linearization coefficients for a specific eddy current probe system, i.e. target material, probe type and cable length.

Figure 5:
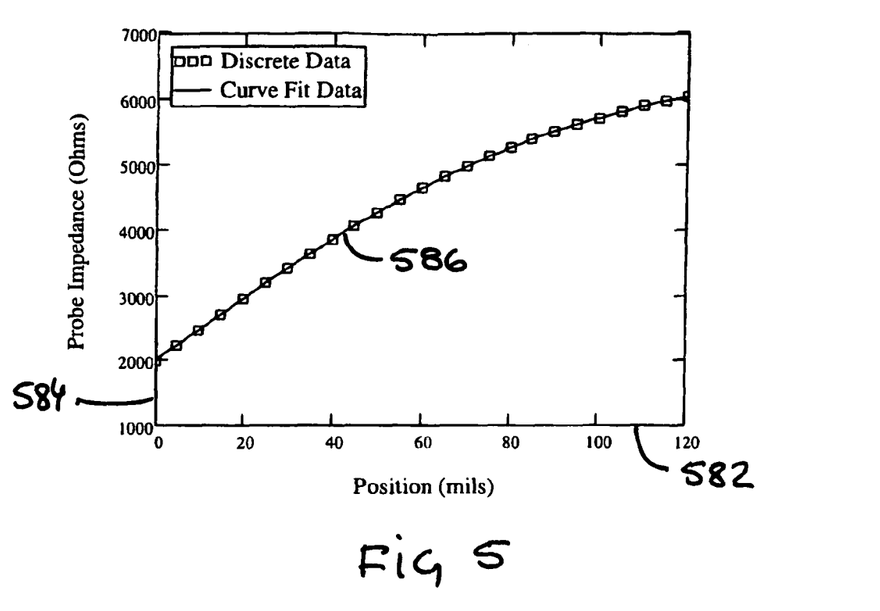
FIG. 5 illustrates discrete and curve fit data of the probe impedance in relation to position/distance between probe and target.

FIG. 5 illustrates the non-linear behavior of the impedance 584 in relation to the distance 582 to the target. This is shown both for the discrete data (squares) and a curve fit data (line) 586. Input for probe response linearization is the oscillator driver response, peak to peak measurement result of oscillator output voltage. Based upon the desired output sensitivity the linearization curve can be defined using the following formula:

$$Lin(Pos) = \frac{Pos \cdot \text{Sensitivity}}{U_{out}(Pos)} \quad [12]$$

Using this linearization function [12] and the function describing the non-linearized output of the oscillator the linearized output response is defined as:

$$\text{Output}(Pos) = U_{out}(Pos) \cdot Lin(Pos) \quad [13]$$

Figure 6:
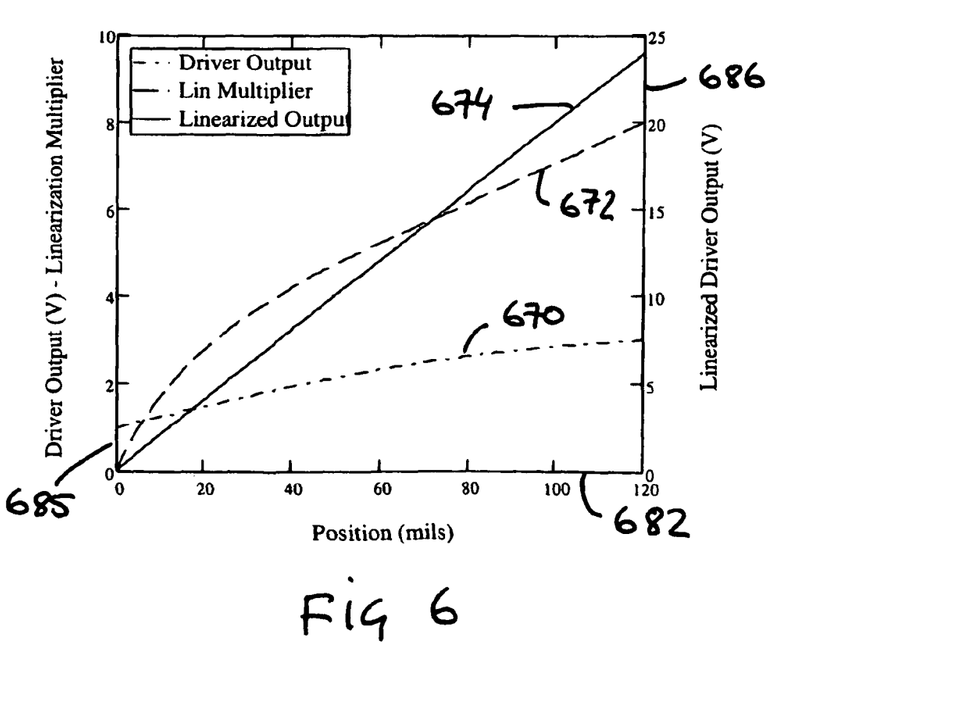
FIG. 6 illustrates the linearization process.

FIG. 6 illustrates the oscillator response voltage 670, 685 as function of gap 682 (distance between probe and target), the required linearization multiplier function 672, 685 as result of desired sensitivity of 200 mV/mil and the resulted linearized output 674, 686. The objective of the linearization process is to describe the linearization function in an $n^{th}$ order polynomial function to allow for on-the-fly linearization of each driver output sample. A polynomial function has been selected as this has a high computational calculation efficiency in combination with hardware multiplier circuitry and thus can be executed fast and reduce overall power consumption. However, for every difference in cable length, probe type, etc., the linearization function will be different. To overcome this issue, multiple experimental curves per probe type are required at reference cable length with small cable capacitance deviations that simulate small cable and probe characteristic deviations and length errors, in order to characterize the range of linearization functions.

As the above principle requires a lot of practical effort a method according to the invention has been introduced to predict the behavior of capacitance variations (cable length differences, inter channel or inter module input differences between ECP inputs) based upon a single reference curve. This mathematical method will calculate the response of multiple curves used as input to create the so-called family linearization libraries used to calibrate the ECP channels.

The intention of this Linearization Prediction model is to make a theoretical prediction of a certain capacitance change range based upon a standard probe single curve measurement. One channel is used as a reference channel as this is available on all models and it's deviation compared to other ECP input channels is somewhere in the middle. This concept requires the actual probe behavior to be small as inductance and resistance variances between probes will result in a different non-linear behavior which basically will not be corrected for using the capacitance variance compensation.

Practical tests have shown that for a group of probes the standard deviation between the quotient of Infinite Gap value and Oscillation frequency provides a good measure for probe equality. Therefore it will be a main objective for probe manufacturing to ensure that these properties will be within specs that result from the actual family linearization library results.

Figure 7:
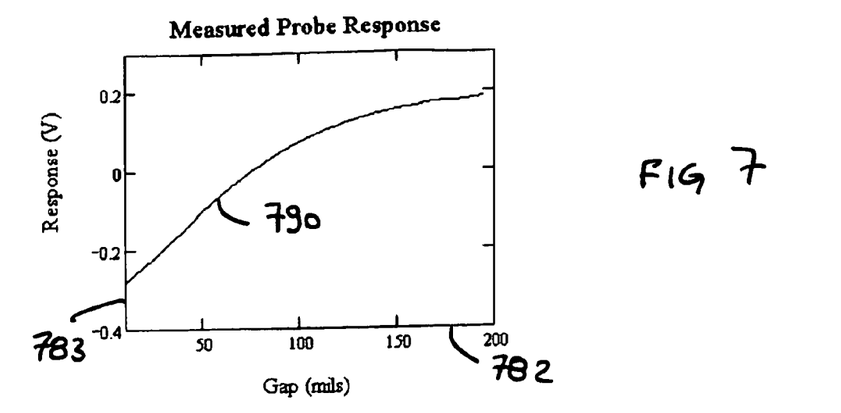
FIG. 7 illustrates a non-linearized probe curve response as measured by the device.
Figure 8:
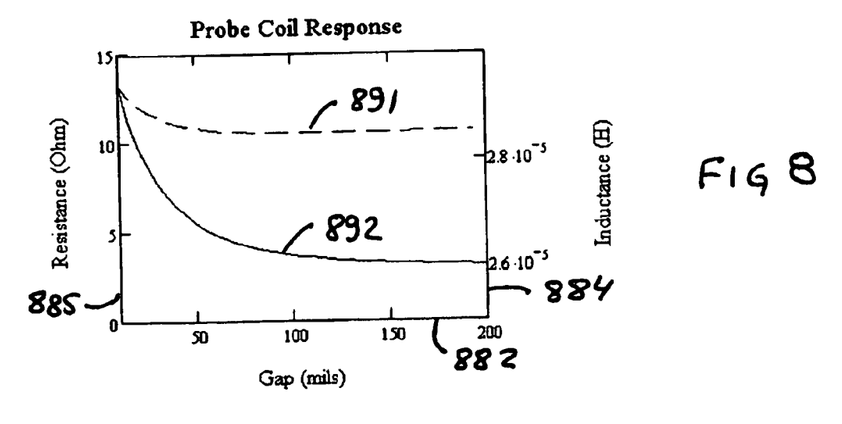
FIG. 8 illustrates probe impedance (L, R) behavior versus distance/gap.

First, as can be seen in FIG. 7, a probe response 783 is measured 790 in relation to gap 782. Based upon this unity gain non-linearized curve the ECP input impedance is calculated based upon known transfer functions of the ECP digital and hardware circuitry. With a known cable compensation capacitance and ECP hardware input impedance, calculate the probe system output impedance. Based upon using lossy transmission line theory applied to probe cable and extension cable length sections, known cable characteristics and inclusion of connector insertion losses, the probe impedance is calculated based upon fact that probe system output impedance is a real impedance when in resonance. The result, as can be seen in FIG. 8, is a measure of the probe tip coil inductance L 884, 891 and loss resistance R 885, 891 for every evaluated gap 882.

Figure 9:
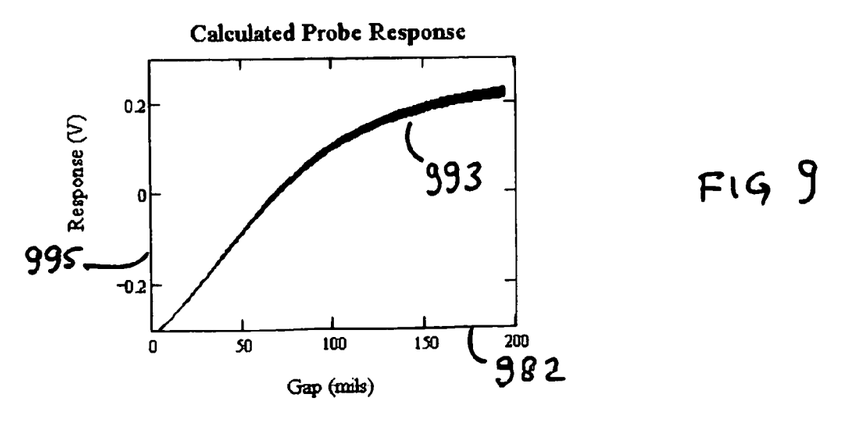
FIG. 9 illustrates modeling results of non-linear probe curve to a range of curves representing different capacitor settings.

Then according to the invention, with the known probe impedance (including module load), the expected response with differences in compensation capacitors (simulating variances in cable length, cable spec variations and differences between input channels) is calculated by reversing the lossy transmission line calculation from probe tip to oscillator input. Due to the change in capacitance a change in frequency is expected and this will affect the resulting resistive impedance when in oscillation. As can be seen In FIG. 9, based upon the newly calculated probe response curves, the known hardware transfer functions can be used again to calculate multiple non-linear gap 982 response 995 curves 993—including associated calculated infinite gap responses—to be used as input for generating the probe family linearization library.

Each probe response (discrete samples) will be translated into the related linearization function and fitted to an $n^{th}$ order polynomial function for each of the evaluated k number of input curves from FIG. 9.

$$\text{Lin}_k(x) = a(1)_k + a(2)_k x + a(3)_k x^2 + a(4)_k x^3 + \ldots + a(n+1)_k x^n \qquad [14]$$

Figure 10:
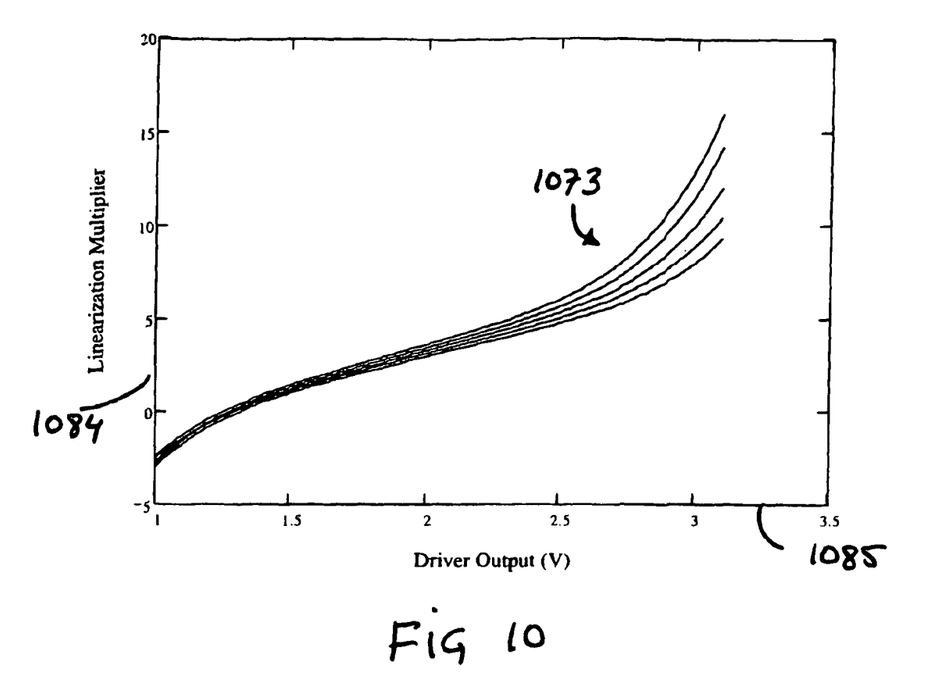
FIG. 10 illustrates a plurality of linearization curves as a function of driver voltage.

As illustrated in FIG. 10, for further calculations the linearization multiplier 1084 curves 1073 as a function of the oscillator output voltage 1085 response is used, and described by the $n^{th}$ order polynomials and related sets of coefficients. The curves 1073 comprise the measured curve and the calculated curves with varying C from the measured curve conditions, as described above.

With the objective of defining a target linearization curve of an unknown probe/cable system within the range of calculated reference curves, the required input of the unknown system will be an infinite gap measurement response. To use the infinite gap measurement response value to define a set of coefficients which best describe the target linearization curve, each corresponding coefficient of the calculated reference linearization curves is curve fitted to a corresponding $m^{th}$ order polynomial using the applicable infinite gap response as reference. This will result in a function that will provide the curve fit result of an individual linearization curve fit coefficient based upon use of the known difference between library infinite gap and measured infinite gap response. As the calculated linearization curves are described with an $n^{th}$ order polynomial this will result in n+1 coefficients. Similar, each of these coefficients will be described by an $m^{th}$ polynomial function with the infinite gap measurement response as input. Consequently the (n+1)*(m+1) coefficients will therefore form the linearization data set. From the above the following functions can be derived describing the coefficients of the desired linearization curve of the unknown probe system with y=Stored library Infinite Gap−Measured Infinite Gap response:

$$\text{Coeff}_{a(1)}(y) = b_1(1) + b_1(2)y + b_1(3)y^2 + \ldots + b_1(m+1)y^m$$

$$\text{coeff}_{a(2)}(y) = b_2(1) + b_2(2)y + b_2(3)y^2 + \ldots + b_2(m+1)y^m \qquad [15]$$

$$\text{coeff}_{a(n+1)}(y) = b_{n+1}(1) + b_{n+1}(2)y + b_{n+1}(3)y^2 + \ldots + b_{n+1}(m+1)y^m$$

Therefore, with calculated reference linearization curves, and a measured infinite gap response with an unknown linearization curve within the boundaries of the reference curves, one can calculate the coefficients describing the desired unknown linearization curve.

The following function, using the driver sample voltage as input (x), can now be used to obtain the linearized response for each acquired data sample:

$$U_{out}(x, y) = \text{Coeff}_{a(1)}(y) + \text{Coeff}_{a(2)}(y) \cdot x + \text{Coeff}_{a(3)}(y) \cdot x^2 + \ldots + \text{Coeff}_{a(n+1)}(y) \cdot x^n \qquad [16]$$

The number of reference curves (k) and the order of the used polynomials (n and m) will determine the accuracy and the working range (spread between reference linearization curves) of the output results.

Figure 11A:
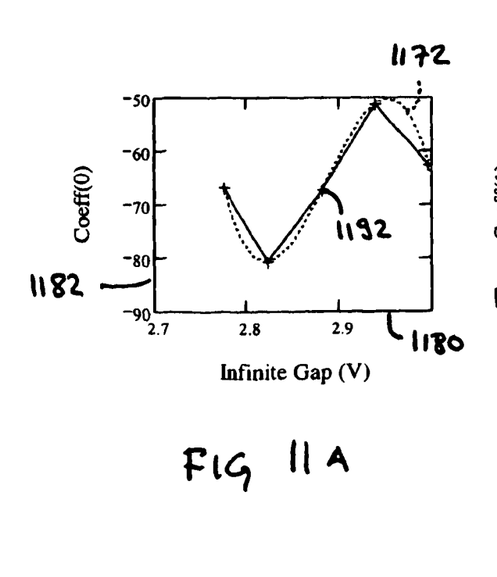
FIG. 11 illustrates coefficient curve fitting examples.
Figure 11B:
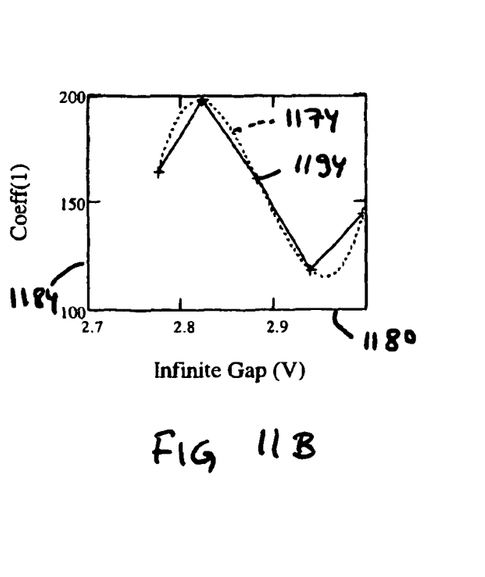

FIGS. 11A and 11B show an example of the curve fitting of the first and second coefficients of a linearization curve function using a 4th order polynomial and 5 reference curves. FIG. 11A shows the values 1182 of the first coefficients 1192 of the 5 reference curves in relation to their corresponding infinite gap value 1180 being curve fitted 1172. FIG. 116 shows the values 1184 of the second coefficients 1194 of the 5 reference curves in relation to their corresponding infinite gap value 1180 being curve fitted 1174. To then get the desired first and second coefficient values one enters the measured infinite gap value into each of these graphs and extracts the coefficients from each of the fitted curves 1172, 1174. As clearly identified in this example, the number of reference curves will improve the accuracy on the coefficients. Therefore the use of the referenced mathematic model is preferred above a practical method as in principle an unlimited number of coefficients could be used. In principle when using small intervals between the curves, a single set of coefficients could be generated to describe the complete range of cable lengths for a specific probe type.

Linearization and prediction method are based upon capacitive changes and therefore accommodate for cable length variations and capacitive difference between the channels and different modules. Probe calibration using this family range will then compensate for small capacitive differences. However, this method is based upon an equal non-linearity of the probe system used. In case of variations in the probe coil this will result in a different non-linear behavior. The earlier mentioned and most computationally efficient post-linearization compensation method will be described in this section.

The base principle for both the post-linearization compensation method is again prediction based upon a theoretical model of non-linearity evaluation as a result of probe tip coil variances compared to the response of a probe reference system. As where the infinite gap value is main reference for the linearization process the compensation method is based upon the quotient of the infinite gap and oscillation frequency of probe system divided by the quotient of the infinite gap and oscillation frequency of the reference probe system, further identified as the infinite gap/oscillation quotient.

First probe manufacturing test data is used to get a curve response for a range of probe coil variances, or possibly a simulation model is used for this purpose. Secondly for Non-linearity difference evaluation for every curve calculate actual linearization coefficients and calculated linearization coefficients based upon reference probe system. Create a compensation library function based upon an array of individual coefficients (4th order polynomial function; a0, a1, etc.) and the corresponding reference of infinite gap/oscillation quotient. Then for every curve calculate the linearization output response based upon the reference probe system linearization library and calculate first order compensation function (offset and gain). Create a compensation library function based upon array of compensation functions and the corresponding reference of infinite gap/oscillation quotient.

With the resulting compensation function the calculated linearization coefficients can be adapted accordingly during the calibration process to optimize the non-linearity differences between probe systems compared to reference system.

Additional advantages of this method using manufacturing data is that it provides direct means of probe manufacturing quality control as probes need to fit into the compensation range as defined by this method. Various stages in the probe manufacturing process can then be tested whether the response is within pre-defined acceptance regions.

Figure 12:
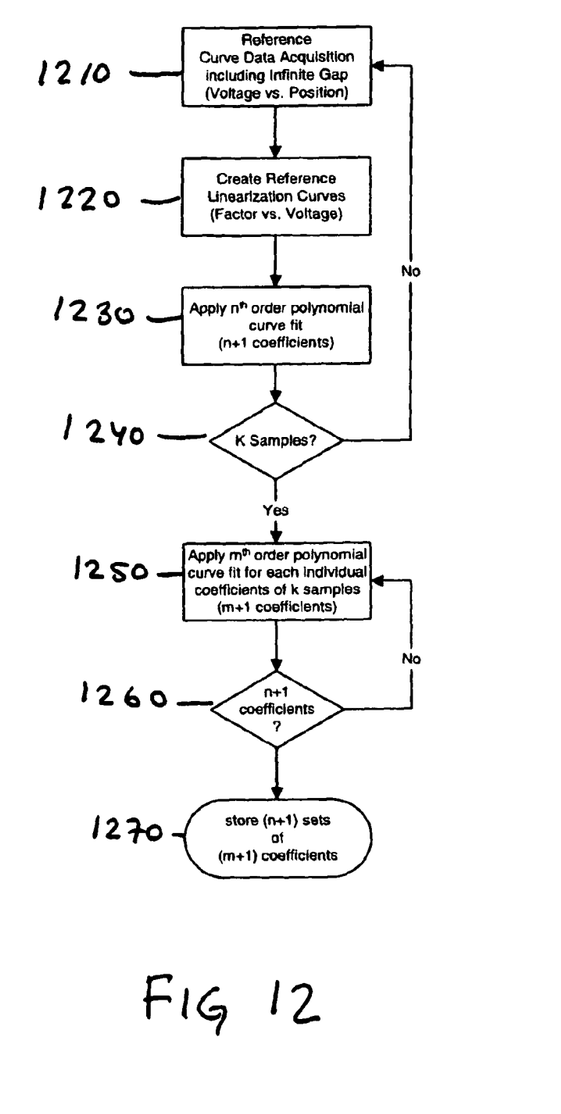
FIG. 12 illustrates a flowchart of generation of coefficients according to the invention.

With reference to the overall process of the presented compensation and linearization process, three major steps can be identified, generation of coefficients, calibration of eddy current channel, and a compensation/linearization process. Generation of coefficients, based upon a number of reference curves under defined conditions, generate the required sets of coefficients that will characterize the compensation and linearization function for a specific probe type and range of supported cable lengths. These are factory-originated data sets that form "library data" for a specific probe type. These data sets are stored and can subsequently be downloaded to monitoring modules, as required. FIG. 12 shows a flowchart indicating the steps of generation of coefficients according to the invention. In a first step 1210 according to the invention, there is reference curve data acquisition including infinite gap, voltage vs. position. After the first step 1210, in a second step 1220 linearization curves are created, factor vs. position. After the second step 1220, in a third step 1230 nth order polynomial curve fit is applied, n+1 coefficients. After the third step 1230, in a fourth step 1240 it is tested if all K samples are done, if not then the procedure goes back to the first step 1210. If all K samples are done, then the procedure continues with a fifth step 1250. After the fourth step 1240 if all K samples are done, then in a fifth step 1250 an mth order polynomial curve fit is applied for each individual coefficients of k samples, m+1 coefficients. After the fifth step 1250, in a sixth step 1260 it is tested if all n+1 coefficients are done, if no, then the procedure goes back to the fifth step 1250. Otherwise if all coefficients are done, then the procedure continues with a seventh step 1270. After the sixth step, if all coefficients are done, then in the seventh step n+1 sets of m+1 coefficients are stored.

Figure 13:
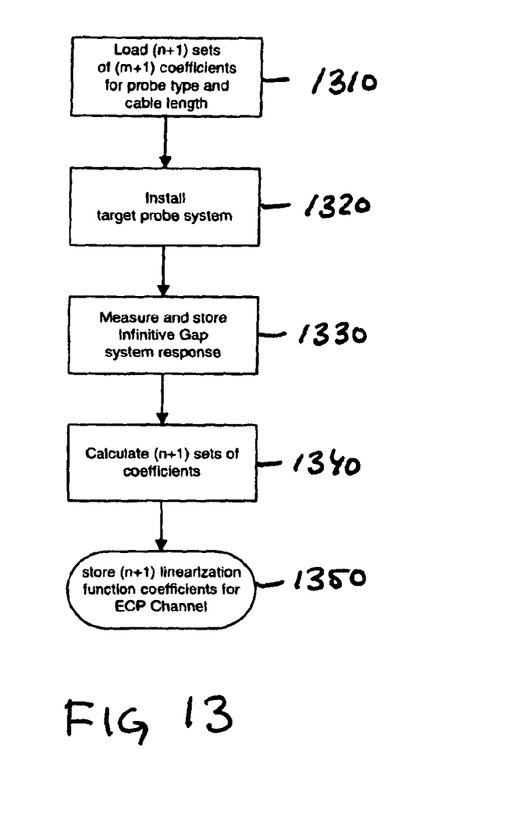
FIG. 13 illustrates a flowchart of calibration of eddy current channel without compensation according to the invention.

Calibration of eddy current probe channel, based upon probe type and cable length, load the appropriate sets of coefficients, install probe system complete with compensating capacitor and measure infinitive gap response and calculate/store the compensation and linearization function coefficient for the applicable eddy current probe channel. This is a module function, usually carried out once, at eddy current probe system installation. FIG. 13 shows a flowchart indicating the steps of calibration of eddy current channel without compensation according to the invention. In a first step 1310 according to the invention, n+1 sets of m+1 coefficients for probe type and cable length are loaded. After the first step 1310, in a second step 1320 the target probe system is installed. After the second step 1320, in a third step 1330 infinitive gap system response is measured and stored. After the third step 1330, in a fourth step 1340 n+1 sets of coefficients are calculated. After the fourth step 1340 in a fifth step 1350 n+1 linearization function coefficients for the ECP channel are stored.

Figure 14:
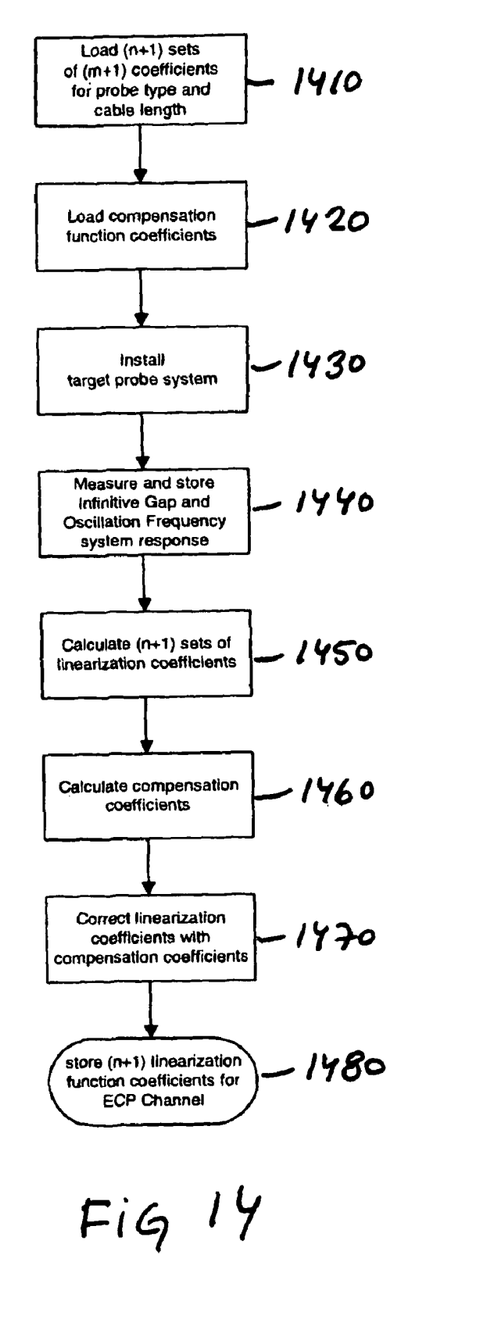
FIG. 14 illustrates a flowchart of calibration of eddy current channel with compensation according to the invention.

FIG. 14 shows a flowchart indicating the steps in the procedure of calibration of eddy current channel with compensation according to the invention. In a first step 1410 according to the invention, n+1 sets of m+1 coefficients for probe type and cable length are loaded. After the first step 1410 in a second step 1420 compensation function coefficients are loaded. After the second step in a third step 1430 the target probe system is installed. After the third step 1430 in a fourth step 1440 infinitive gap system response and oscillation frequency system response is measured and stored. After the fourth step 1440 in a fifth step 1450 n+1 sets of linearization coefficients are calculated. After the fifth step 1450 in a sixth step 1460 compensation coefficients are calculated. After the sixth 1460 step in a seventh step 1470 the linearization coefficients are corrected with compensation coefficients.

Finally after the seventh step 1470 in an eighth step 1480 n+1 linearization function coefficients are stored for the ECP channel.

Figure 15:
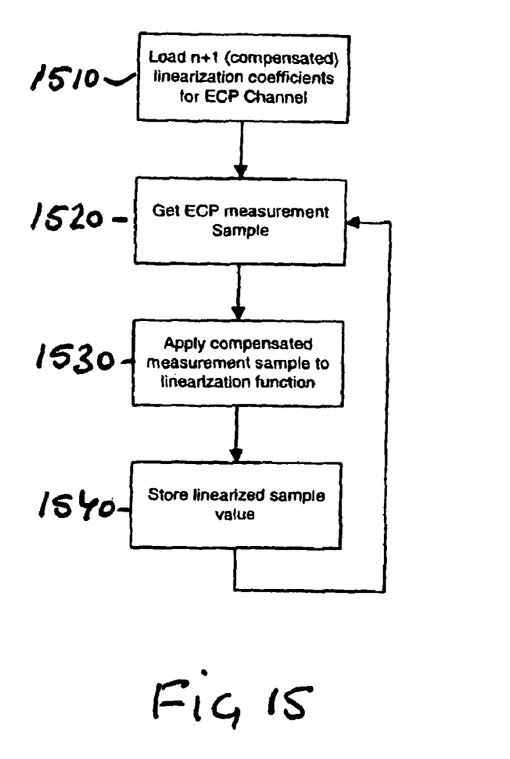
FIG. 15 illustrates a flowchart of a compensation/linearization process according to the invention.

For every eddy current probe channel the (compensated) linearization coefficients are loaded and driver sample data acquisition is started and compensation is applied to each individual sample and the linearization function is applied to the result thereof. This is a module function where linearization is carried out "on-the-fly" as part of the sampling process and the linearized samples are then further processed by digital filtering and signal assessment techniques. FIG. 15 illustrates a flowchart of the Compensation/Linearization process according to the invention. In a first step 1510 according to the invention, n+1 (compensated) linearization coefficients are loaded for the ECP channel. After the first step 1510 or a fourth step 1540 in a second step 1520 an ECP measurement sample is taken/retrieved. After the second step 1520 in a third step 1530 a compensated measurement sample is applied to the linearization function. After the third step 1530 in the fourth step 1540 the linearized sample value is stored and the procedure then returns to the second step 1520.

The invention is not restricted to the above-described embodiments, but may be varied within the scope of the following claims.

| | |
|---|---|
| FIG. 1 | illustrates an oscillator according to the invention, |
| 100 | Probe/Probe impedance Z, |
| 101 | Resistor R, |
| 105 | Uout, |
| 106 | Uin, |
| 107 | U, |
| 110 | ×1 buffer, |
| 111 | times a multiplier/buffer, |
| 112 | Ulimiter, |
| 113 | optional times c multiplier, resistor |
| 114 | times b multiplier/buffer, resistor |
| 115 | adder, adding point |
| 116 | ×1 buffer, |
| FIG. 2 | |
| 284 | probe impedance |
| 285 | driver output |
| 288 | function between probe impedance and driver output |
| FIG. 3 | illustrates a block diagram of a driver according to the invention, |
| 302 | Probe, |
| 303 | Cable, |
| 305 | High frequency output signal from oscillator part, |
| 308 | Amplitude output signal from demodulator/peak to peak detector, |
| 341 | "Oscillator" part of driver, including probe and cable as these are a part of the complete oscillator, |
| 342 | Demodulator and peak ot peak detector, |
| 352 | Driver according to the invention, |
| 390 | Excitation part of oscillator according to invention |
| FIG. 4 | illustrates a block diagram of a digital driver according to the invention, |
| 405 | High frequency output signal from oscillator part, |
| 408 | Amplitude output signal from demodulator/peak to peak detector, |
| 441 | "Oscillator" part of driver, including probe and cable as these are a part of the complete oscillator, |
| 442 | Demodulator and peak to peak detector, |
| 492 | Analog to digital converter, |
| 494 | Digital signal processing, |
| 496 | Input/Output interface. |
| FIG. 5 | illustrates discrete and curve fit data of the probe impedance in relation to position/distance between probe and target, |
| 582 | Position/distance between target and probe, |
| 584 | Probe impedance in Ohms, |
| 586 | Curves. |
| FIG. 6 | illustrates the linearization process, |
| 670 | Probe driver output curve, |
| 672 | Linearization multiplier factor curve, |
| 674 | Linearized output curve (line), |
| 682 | Position/distance between probe and target material in mils, |
| 685 | Both the driver output in Volts and the Linearization multiplication factor, |
| 686 | Linearized driver output in Volts, |
| FIG. 7 | illustrates a non-linearized probe curve response as measured by the device, |
| 782 | Gap between probe and target material |
| 783 | Response |
| 790 | Measured probe response curve |
| FIG. 8 | illustrates probe impedance (L, R) behavior versus distance/gap, |
| 882 | Gap between probe and target material |
| 884 | Inductance (H) |
| 885 | Resistance (Ohm) |
| 891 | probe coil inductance curve vs. gap |
| 892 | probe coil resistance curve vs. gap |
| FIG. 9 | illustrates modeling results of non-linear probe curve to a range of curves representing different capacitor settings, |
| 982 | Gap between probe and target material |
| 993 | Calculated probe response curves with varying C |
| 995 | Response |
| FIG. 10 | illustrates a plurality of linearization curves as a function of driver voltage, |
| 1073 | A plurality of different linearization curves for different probes/cables . . . , |
| 1084 | Linearization multiplier factor. |
| 1085 | Driver output voltage, |
| FIGS. 11A & 11B | illustrates coefficient curve fitting examples, |
| 1172 | Fitted curve to discrete Coeff (0), |
| 1174 | Fitted curve to discrete Coeff (1), |
| 1180 | Infinite gap voltage, |
| 1182 | Coefficient (0) scale, |
| 1184 | Coefficient (1) scale, |
| 1192 | Discrete points Coeff (0), |
| 1194 | Discrete points Coeff (1), |
| FIG. 12 | illustrates a flowchart of generation of coefficients according to the invention, |
| 1210 | a first step of according to the invention, Reference curve data acquisition including infinite gap, voltage vs position, |
| 1220 | after the first step: a second step of, Create reference linearization curves, factor vs position |
| 1230 | after the second step: a third step of apply nth order polynomial curve fit, n + 1 coefficients, |
| 1240 | Fourth step, All K samples done, if no back to the first step, if yes then the fifth step, |
| 1250 | Fifth step, Apply mth order polynomial curve fit for each individual coefficients of k samples, m + 1 coefficients, |
| 1260 | Sixth step, all n + 1 coefficients?, if no, then back top the fifth step, if yes then to the seventh step, |
| 1270 | Seventh step, store n + 1 sets of m + 1 coefficients. |
| FIG. 13 | illustrates a flowchart of calibration of eddy current channel without compensation according to the invention, |
| 1310 | a first step of according to the invention, load n + 1 sets of m + 1 coefficients for probe type and cable length |
| 1320 | after the first step: a second step of, install the target probe system |
| 1330 | after the second step: a third step of measure and store infinitive gap system response |
| 1340 | fourth step, calculate n + 1 sets of coefficients, |
| 1350 | fifth step, store n + 1 linearization function coefficients for ECP channel. |
| FIG. 14 | illustrates a flowchart of calibration of eddy current channel with compensation according to the invention, |
| 1410 | a first step of according to the invention, load n + 1 sets of m + 1 coefficients for probe type and cable length |
| 1420 | after the first step, a second step of loading compensation function coefficients |
| 1430 | after the second step: a third step of, install the target probe system |
| 1440 | after the third step: a fourth step of measure and store infinitive gap system response and oscillation frequency system response |
| 1450 | after the fourth step, a fifth step, calculate n + 1 sets of linearization coefficients, |
| 1460 | after the fifth step, a sixth step to calculate compensation coefficients |
| 1470 | after the sixth step, a seventh step to correct linearization coefficients with compensation coefficients |
| 1480 | after the seventh step, an eighth step, store n + 1 linearization function coefficients for ECP channel. |
| FIG. 15 | illustrates a flowchart of a compensation/linearization process according to the invention, |
| 1510 | a first step of according to the invention, load n + 1 (compensated) linearization coefficients for ECP channel |

-continued

| | |
|---|---|
| 1520 | after the first step or fourth step: a second step to get ECP measurement sample, |
| 1530 | after the second step, a third step step, apply compensated measurement sample to linearization function, |
| 1520 | after the third step, a fourth step, store linearized sample value and return to second step. |

The invention claimed is:

1. An eddy current probe oscillator unit having a voltage input and a voltage output and arranged to be coupled to an eddy current probe, the eddy current probe oscillator unit comprising:
 a voltage input, and
 a voltage output, and
 a dual feedback loop including a first leg and a second leg, wherein
 the second leg is a voltage limiter that clips the voltage level at a predetermined maximum value used to create a defined voltage limited input that remains in phase with the output signal, wherein
 the voltage limiter is a high gain stage that ensures the voltage limiting and clipping during start up, wherein
 gain stages (a) and (b) that will, in combination with an output voltage divider R and a Zprobe impedance of the eddy current probe, ensure that overall feedback gain is unity and in-phase with the output signal, and wherein
 the eddy current probe oscillator unit is frequency independent and eliminates the need for parallel compensation inductors, that could change response over time.

2. The eddy current oscillator unit according to claim 1, wherein an attached eddy current probe and a cable attaching the eddy current probe to the eddy current probe oscillator unit form a parallel LC tank of the eddy current oscillator unit.

3. The eddy current oscillator unit according to claim 1, wherein a gain of the first leg of the dual feedback loop at least in part defines the amplitude gain of the oscillator unit.

4. The eddy current oscillator unit according to claim 1, wherein a gain of the second leg of the dual feedback loop at least in part defines a linearity of probe impedance detection sensitivity.

5. The eddy current oscillator unit according to claim 1, wherein a gain of the first leg and a gain of the second leg of the dual feedback loop defines a linearity of probe impedance detection sensitivity.

6. A vibration monitoring system arranged to monitor at least one rotating part by means of measurements from at least one eddy current probe, comprising:
 a distributed unit proximal to the at least one rotating part, the distributed unit comprising an eddy current driver including a dual feedback loop having a first leg and a second leg, and
 the second leg is a voltage limiter that clips the voltage level at a predetermined maximum value used to create a defined voltage limited input that remains in phase with the output signal, and wherein
 the voltage limiter is a high gain stage that ensures the voltage limiting and clipping during start up, and
 gain stages (a) and (b) that will, in combination with an output voltage divider R and a Zprobe impedance of the eddy current probe, ensure that overall feedback gain is unity and in-phase with the output signal, and wherein
 the eddy current probe oscillator unit is frequency independent and eliminates the need for parallel compensation inductors, that could change response over time.

7. The vibration monitoring system according to claim 6, wherein the distributed unit is arranged to be located in a Zone 1 environment and the at least one rotating part is located in a Zone 1 environment.

\* \* \* \* \*